(No Model.)  2 Sheets—Sheet 1.
E. H. GOLD.
STEAM TRAP.
No. 394,167.  Patented Dec. 11, 1888.
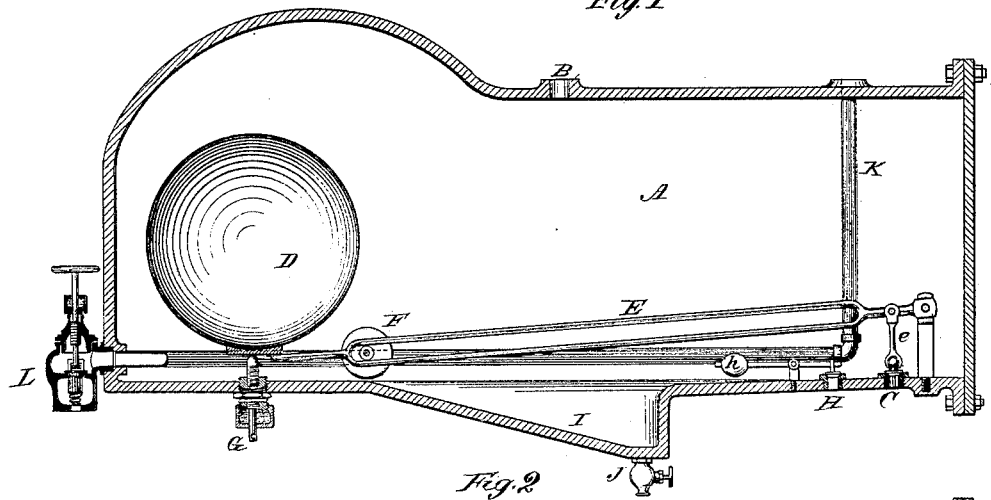
Fig. 1
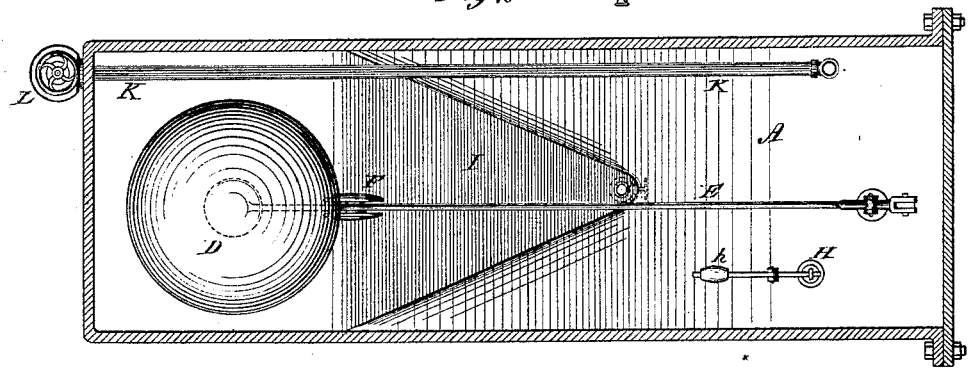
Fig. 2

Fig. 5 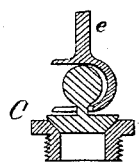   Fig. 6 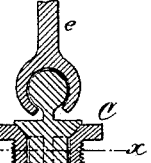

WITNESSES:
Raphaël Netter
Robt. F. Gaylord
INVENTOR.
Egbert H. Gold.
BY
Duncan Curtis & Page
ATTORNEY.

(No Model.) 2 Sheets—Sheet 2.
E. H. GOLD.
STEAM TRAP.
No. 394,167. Patented Dec. 11, 1888.
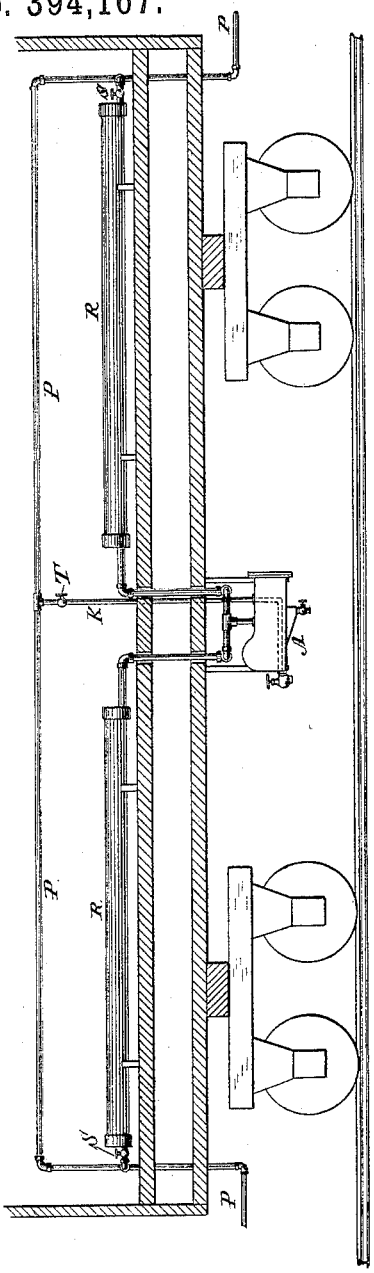
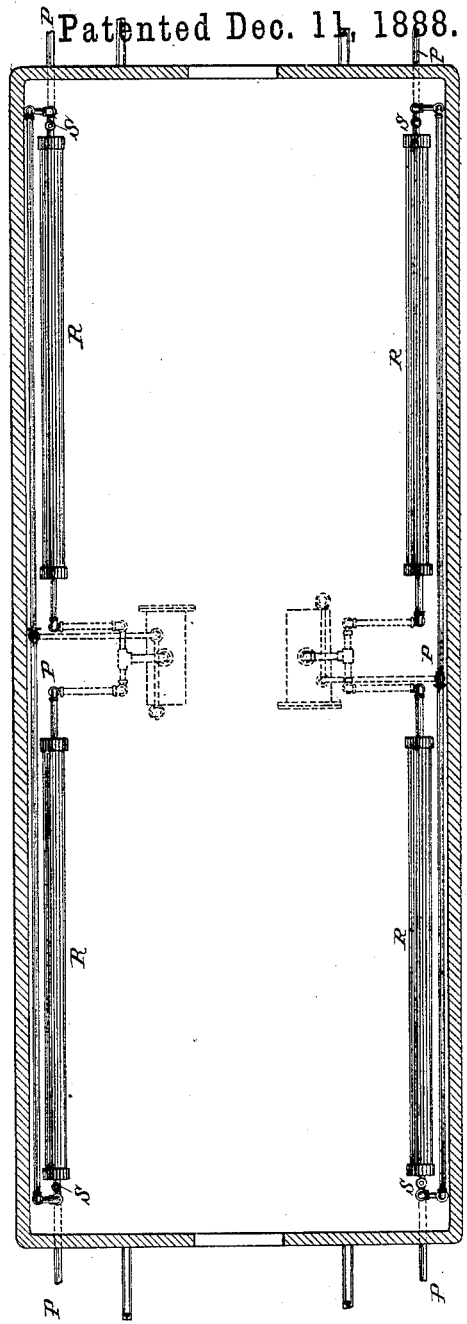
WITNESSES:
Raphael Netter
Robt. F. Gaylord
INVENTOR,
Egbert H. Gold
BY
Duncan Curtis & Page
ATTORNEY,

UNITED STATES PATENT OFFICE.

EGBERT H. GOLD, OF ENGLEWOOD, NEW JERSEY.

STEAM-TRAP.

SPECIFICATION forming part of Letters Patent No. 394,167, dated December 11, 1888.

Application filed May 22, 1888. Serial No. 274,748. (No model.)

*To all whom it may concern:*

Be it known that I, EGBERT H. GOLD, a citizen of the United States, residing in Englewood, county of Bergen, and State of New Jersey, have invented certain new and useful Improvements in Steam-Traps; and I do hereby declare the following to be a full, clear, and exact description of the invention, which will enable others skilled in the art to which it appertains to make and use the same.

The invention relates to certain improvements in steam-traps; and it is designed specially for use in connection with steam radiators or coils employed for heating railway-cars or other carriages, although it will be found serviceable in other connections.

In cold weather the small amount of water which remains in a steam-trap that temporarily is not in use is liable to become frozen. When this occurs, it interferes with the prompt action of the discharge-valve upon the trap being again brought into use by causing the valve to stick on its seat.

The present invention seeks, as its main feature, to provide a means for quickly thawing the water when thus congealed, and thus promptly bringing the trap into effective action. It also seeks to provide a means for promptly opening the main discharge-valve to its full extent when once it has begun to rise. It also provides a special relief-valve for opening the trap automatically whenever steam is cut off.

Figure 3:
Figure 4:
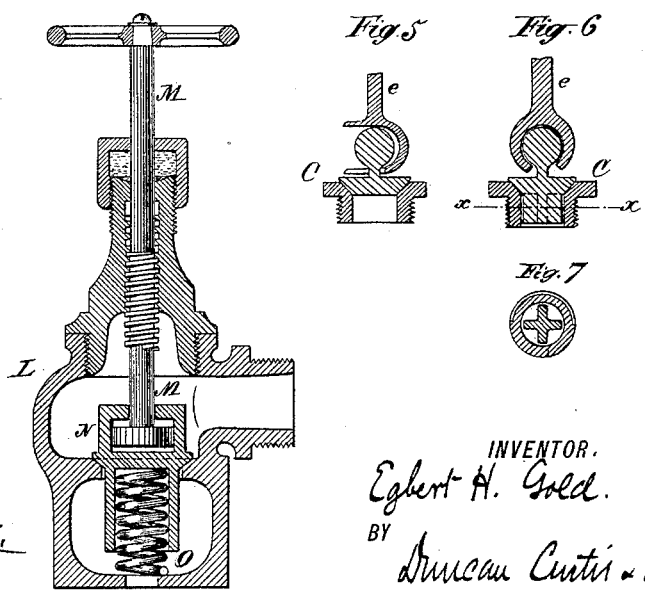
Figure 7:

Referring to the accompanying drawings, Figure 1 is a vertical sectional view of the improved trap, Fig. 2 being a plan view in section, showing the arrangement of the several parts, and Figs. 3, 4, 5, 6, and 7 being detailed views of the valves and other parts, while Figs. 8 and 9 show, the one in plan and the other in elevation, the arrangement of the trap in relation to the heaters of an ordinary railway-car.

A is the trap, with its inlet part at B and the principal discharge-valve at C. This discharge-valve is operated by the float D through the medium of the lever E and link *e*. A shifting weight, F, arranged to roll along the slot in lever E, aids in securing the prompt full opening of valve C. Whenever the float is lifted by the water in the trap far enough to raise the outer end of the lever above the horizontal line, the shifting weight rolls down to the inner end of the slot, and by thus shifting the center of gravity causes the float to rise the more rapidly. The construction of valve C and its mode of connection with link *e* are fully illustrated in the detail views shown in Figs. 5, 6, and 7, Figs. 5 and 6 being vertical sections at right angles with each other, and Fig. 7 being a section on the line *x x* of Fig. 6.

G is an adjustable stop for regulating the downward movement of the float, the object being to steady the motion of the float when it descends. This stop may be made in the form of a screw-pin working through a stuffing-box and plug.

H is an auxiliary balance-valve. As shown in the drawings, it is balanced by a counter-weight, *h*, although it is plain that a spring might be used for this purpose with substantially the same effect as the valve. The counter-weight is to be so adjusted that when there is a pressure of steam in the trap the valve will remain closed; but just so soon as steam is taken off the valve leaves its seat, and thus automatically discharges any water then remaining in the trap, except what may have gathered in the sink I.

J is a cock through which from time to time any sediment that has collected in the trap can be drawn off, the bottom of the trap by preference being constructed with a sink or belly into which the sediment may descend.

K is a tube for live steam. This tube enters the trap near its top, or at any other convenient point, and traverses the length of the trap near its bottom. It terminates in the relief-valve L. In lieu of this tube K, a chamber for live steam may be cast with the case or box of the trap. This valve is shown in detail in sectional view in Fig. 4. As there shown, the screw-spindle M, by which the valve proper is operated, is attached to the valve by means of a yoke, N, so constructed as to allow some play between the valve and its spindle. A socket on the under side of the valve receives a spiral spring, O, the tendency of which is to lift the valve off from its seat. By turning the spindle down the valve can be held positively to its seat against the stress of the spring. So, also, if there happens to be sufficient pressure of steam in the valve-chamber, the valve will be held to its seat against the tension of the spring even if the spindle be turned up far enough to lift the boss on its lower end out of contact with the bottom of the yoke. If, however, the spindle be turned up farther, so as to strike against the top of the yoke, it will lift the valve away from its seat notwithstanding the steam-pressure in the valve-chamber.

Figs. 8 and 9 show the trap as applied to an ordinary railway-car.

P is a pipe through which live steam passes, and R R are heaters placed within the car, the trap A being by preference placed underneath the body of the car.

S S are valves for opening and closing connection between the steam-pipe and the heaters, and T is a valve which opens and closes the direct connection between the steam-pipe and the trap.

By opening the valves T and L, when the car is first connected with the source of supply, live steam will flow freely through the pipe K, and the interior of the trap will be rapidly heated and the valves C and H thawed out and brought into working condition. Then the heaters R R can be opened and steam admitted without danger of the water of condensation flooding the trap.

As above indicated, it will be found desirable to open the valve L to its full capacity while the trap is being heated up; but when the trap has been heated it will be advisable to turn the spindle down until the pressure of the steam will nearly shut the valve down to its seat.

The steam-pipe K might be made to discharge live steam directly into the trap; but it is believed that ordinarily it will be better to carry this pipe through the trap and let it discharge through a valve outside.

It is not claimed that it is new to operate the discharge-valve of a steam-trap by means of a float; but

What is claimed as new is as follows:

1. In combination with a steam-trap, a pipe for live steam entering and traversing said trap, whereby the interior of the trap and the valves may be heated, substantially as and for the purposes set forth.

2. In combination with a steam-trap, a steam-pipe passing through the same, and a relief-valve connected with such pipe, such valve being provided with a spring for lifting it from its seat, and with a spindle by means of which it can be closed firmly upon its seat or raised clear therefrom, substantially as and for the purpose set forth.

EGBERT H. GOLD.

Witnesses:
FRANK E. HARTLEY,
FRANK B. MURPHY.